(12) United States Patent
Berkun (10) Patent No.: US 9,317,792 B2
(45) Date of Patent: Apr. 19, 2016

(54) METHOD AND APPARATUS FOR USING A LIMITED CAPACITY PORTABLE DATA CARRIER

(75) Inventor: Kenneth Berkun, Kailua, HI (US)

(73) Assignee: LTT, LTD, Redmond, WA (US)

( * ) Notice: Subject to any disclaimer, the term of this patent is extended or adjusted under 35 U.S.C. 154(b) by 427 days.

(21) Appl. No.: 13/535,095

(22) Filed: Jun. 27, 2012

(65) Prior Publication Data

US 2013/0175348 A1    Jul. 11, 2013

Related U.S. Application Data

(62) Division of application No. 12/079,240, filed on Mar. 24, 2008, now Pat. No. 8,226,007.

(60) Provisional application No. 60/919,841, filed on Mar. 23, 2007.

(51) Int. Cl.
*G06K 5/04* (2006.01)
*G06K 19/06* (2006.01)
*G06K 7/14* (2006.01)
*G06K 1/12* (2006.01)

(52) U.S. Cl.
CPC ............ *G06K 19/06037* (2013.01); *G06K 1/12* (2013.01); *G06K 7/14* (2013.01); *G06K 7/1491* (2013.01)

(58) Field of Classification Search
USPC ................ 235/462.12, 462.1, 426.16, 462.25
See application file for complete search history.

(56) References Cited

U.S. PATENT DOCUMENTS

| | | |
|---|---|---|
| 4,337,375 A | 6/1982 | Freeman |
| 5,288,976 A | 2/1994 | Citron et al. |
| 5,294,783 A | 3/1994 | Hammond, Jr. et al. |
| 5,378,881 A | 1/1995 | Adachi |
| 5,406,024 A | 4/1995 | Shioda |
| 5,489,769 A | 2/1996 | Kubo |
| 5,550,365 A | 8/1996 | Klancnik et al. |
| 5,631,457 A | 5/1997 | Fukuda et al. |
| 5,880,453 A | 3/1999 | Wang et al. |
| 5,938,727 A | 8/1999 | Ikeda |
| 5,986,651 A | 11/1999 | Reber et al. |

(Continued)

FOREIGN PATENT DOCUMENTS

| | | |
|---|---|---|
| DE | 10144624 | 9/2001 |
| EP | 1101351 | 5/2001 |

(Continued)

OTHER PUBLICATIONS

Olympus Optical Co. Ltd. Annual Report (1999), ScanTalk Reader R200 pp. 18.

(Continued)

*Primary Examiner* — Ahshik Kim
(74) *Attorney, Agent, or Firm* — Christopher A. Wiklof; Nicholas S. Bromer; Launchpad IP, Inc.

(57) ABSTRACT

A method for reading and using partial data from a portable data carrier includes reading data from a portable data carrier, determining if any data is missing, and if any data is missing, restructuring the data for use, such as for running an audio decoder and expander. A method for writing data to a portable data carrier having limited capacity includes receiving a data file and optimizing at least one encoding parameter to fit at least a portion of the data file into the portable data carrier.

15 Claims, 8 Drawing Sheets

(56) References Cited

U.S. PATENT DOCUMENTS

| | | | |
|---|---|---|---|
| 6,042,014 A | 3/2000 | Zannetti | |
| 6,095,418 A | 8/2000 | Swartz et al. | |
| 6,129,279 A | 10/2000 | Colley et al. | |
| 6,144,848 A | 11/2000 | Walsh et al. | |
| 6,212,504 B1 * | 4/2001 | Hayosh | 705/64 |
| 6,330,972 B1 | 12/2001 | Wiklof et al. | |
| 6,400,482 B1 | 6/2002 | Lupton et al. | |
| 6,418,457 B1 | 7/2002 | Schmidt et al. | |
| 6,437,229 B1 | 8/2002 | Nobumoto | |
| 6,574,441 B2 | 6/2003 | McElroy | |
| 6,587,127 B1 | 7/2003 | Leeke et al. | |
| 6,604,682 B2 | 8/2003 | Wakamiya et al. | |
| 6,629,635 B1 | 10/2003 | Akamine | |
| 6,633,685 B1 | 10/2003 | Kusama et al. | |
| 6,688,524 B1 | 2/2004 | Bottazzi et al. | |
| 6,695,211 B2 | 2/2004 | Keys et al. | |
| 6,906,812 B2 | 6/2005 | Koakutsu et al. | |
| 6,928,421 B2 | 8/2005 | Craig et al. | |
| 7,055,744 B2 | 6/2006 | Tani | |
| 8,662,396 B2 * | 3/2014 | Berkun et al. | 235/462.1 |
| 2002/0037168 A1 | 3/2002 | Horil et al. | |
| 2002/0042878 A1 | 4/2002 | Westendorf et al. | |
| 2003/0012557 A1 | 1/2003 | Tingey et al. | |
| 2003/0048882 A1 | 3/2003 | Smith, II | |
| 2003/0103645 A1 | 6/2003 | Levy et al. | |
| 2003/0136837 A1 | 7/2003 | Amon et al. | |
| 2003/0155368 A1 | 8/2003 | Giancarlo | |
| 2003/0189089 A1 | 10/2003 | Raistrick et al. | |
| 2004/0108381 A1 | 6/2004 | Elliott et al. | |
| 2004/0215452 A1 * | 10/2004 | Pearah et al. | 704/231 |
| 2005/0010409 A1 | 1/2005 | Hull et al. | |
| 2005/0041120 A1 | 2/2005 | Miller | |
| 2005/0099318 A1 | 5/2005 | Gilfix et al. | |
| 2005/0199699 A1 | 9/2005 | Sato et al. | |
| 2005/0211776 A1 | 9/2005 | Morgan et al. | |
| 2005/0269416 A1 * | 12/2005 | Sussmeier et al. | 235/494 |
| 2006/0054702 A1 | 3/2006 | Lei | |
| 2006/0096142 A1 | 5/2006 | Chen et al. | |
| 2006/0111967 A1 | 5/2006 | Forbes | |
| 2006/0202040 A1 | 9/2006 | Wang et al. | |
| 2006/0227671 A1 * | 10/2006 | Tobita et al. | 369/30.01 |
| 2006/0249573 A1 | 11/2006 | Berkun | |
| 2000/8001585 | 1/2008 | Pearah et al. | |
| 2008/0159533 A1 | 7/2008 | Schryer et al. | |
| 2011/0011926 A1 * | 1/2011 | Matsumoto | 235/375 |

FOREIGN PATENT DOCUMENTS

| | | |
|---|---|---|
| EP | 1143372 | 10/2001 |
| EP | 1146418 | 10/2001 |
| EP | 1190375 | 3/2002 |
| EP | 1183641 | 12/2002 |
| EP | 1480160 | 11/2004 |
| JP | 07-085085 | 9/1993 |
| JP | 07-085085 | 3/1995 |
| JP | 01-51368 | 2/2001 |
| JP | 2001-51368 | 2/2001 |
| JP | 2001-108513 | 4/2001 |
| JP | 01-108513 | 6/2001 |
| WO | 0232108 | 4/2002 |
| WO | 0232109 | 4/2002 |
| WO | WO0232108 | 4/2002 |
| WO | WO0232109 | 4/2002 |
| WO | 02069243 | 9/2002 |
| WO | WO02069243 | 9/2002 |
| WO | 2004008378 | 1/2004 |
| WO | WO2004008378 | 1/2004 |

OTHER PUBLICATIONS

PCT International Search Report and Written Opinion for PCT International Application No. PCT/US2008/003883 mailed Aug. 22, 2008.

Olympus Optical Co., Ltd. Annual Report 1999, ScanTalk Reader R200, p. 18.

* cited by examiner

METHOD AND APPARATUS FOR USING A LIMITED CAPACITY PORTABLE DATA CARRIER

CROSS-REFERENCE TO RELATED APPLICATIONS

This application is a Divisional application of the U.S. patent application Ser. No. 12/079,240, entitled "METHOD AND APPARATUS FOR USING A LIMITED CAPACITY PORTABLE DATA CARRIER", filed Mar. 24, 2008 now U.S. Pat. No. 8,226,007; which claims priority benefit from and incorporates by reference herein U.S. Provisional Patent Application No. 60/919,841, entitled "METHOD AND APPARATUS FOR STORING AND READING LOSSY DATA IN AN OPTICALLY SCANNED PATTERN", filed Mar. 23, 2007.

This application relates to subject matter found in the U.S. patent application Ser. No. 12/079,241, entitled "METHOD AND APPARATUS FOR READING A PRINTED INDICIA WITH A LIMITED FIELD OF VIEW SENSOR", filed on Mar. 24, 2008, and incorporated by reference herein.

TECHNICAL FIELD

This disclosure relates to printing or writing, reading, and using data with machine-readable portable data carriers, and especially to printing or writing, reading, and using data with machine-readable portable data carriers having limited capacity.

BACKGROUND

High capacity media may be referred to as machine readable portable data carriers, and may for example include two-dimensional (2D) bar code symbols, read-write radio frequency tags (RF tags), write-once-read-many-times (WORM) RF tags, etc.

Large nominal data capacities may generally require large areas of real estate for printing 2D symbols or prohibitively expensive RF tags. Some data types, for example digital audio files or digital video files may nominally include relatively large amounts of data. A problem may exist with respect to using large data files with limited capacity portable data carriers.

OVERVIEW

According to an embodiment, data may be stored in and retrieved from a portable data carrier by making a compromise regarding the delivery guarantee of the payload data delivery. According to an embodiment, data may be so stored and retrieved in conjunction with applications adapted to or that inherently operate with less than complete recovery of stored data.

According to an embodiment, audio or video data may be stored in a portable data carrier. Such data may be inherently forgiving for partial loss owing to the ability of human vision and hearing to "fill in the blanks" during playback of lossy program material.

According to an embodiment, an application may be configured to accept lossy data by providing an automated or user-assisted method for determining lost data values.

According to an embodiment, more data may be stored in a given amount of physical space or memory capacity because of the reduction in symbol overhead and/or data may be stored in a smaller amount of physical space or memory capacity.

According to an embodiment, a data file may include error correction. Such a data file may be stored in a portable data carrier without error correction. The native error correction in parts of the recovered data file may be used to recover substantially all the data.

According to an embodiment, a data file may include error correction in a native format. The data file may be converted to substantially remove the error correction from the data file and stored in a portable data carrier having error correction. The error correction in the portable data carrier may be used to recover substantially all the data in the data file.

According to an embodiment, a portable data carrier may include a printed pattern such as a 1D or 2D bar code symbol.

According to an embodiment, a portable data carrier may include a radio frequency tag (RF tag).

According to an embodiment, an end device may be configured to interrogate a portable data carrier and process lossy information received from the portable data carrier.

According to an embodiment, a system such as a networked system may be configured to interrogate a portable data carrier and process lossy information received from the portable data carrier.

According to an embodiment, a method for reading and using partial data from a portable data carrier includes reading data from a portable data carrier, determining if any data is missing, and if any data is missing, restructuring the data for use, such as for running an audio decoder and expander.

According to an embodiment, a method for writing data to a portable data carrier having limited capacity includes receiving a data file and optimizing at least one encoding parameter to fit at least a portion of the data file into the portable data carrier.

DETAILED DESCRIPTION

Figure 1:
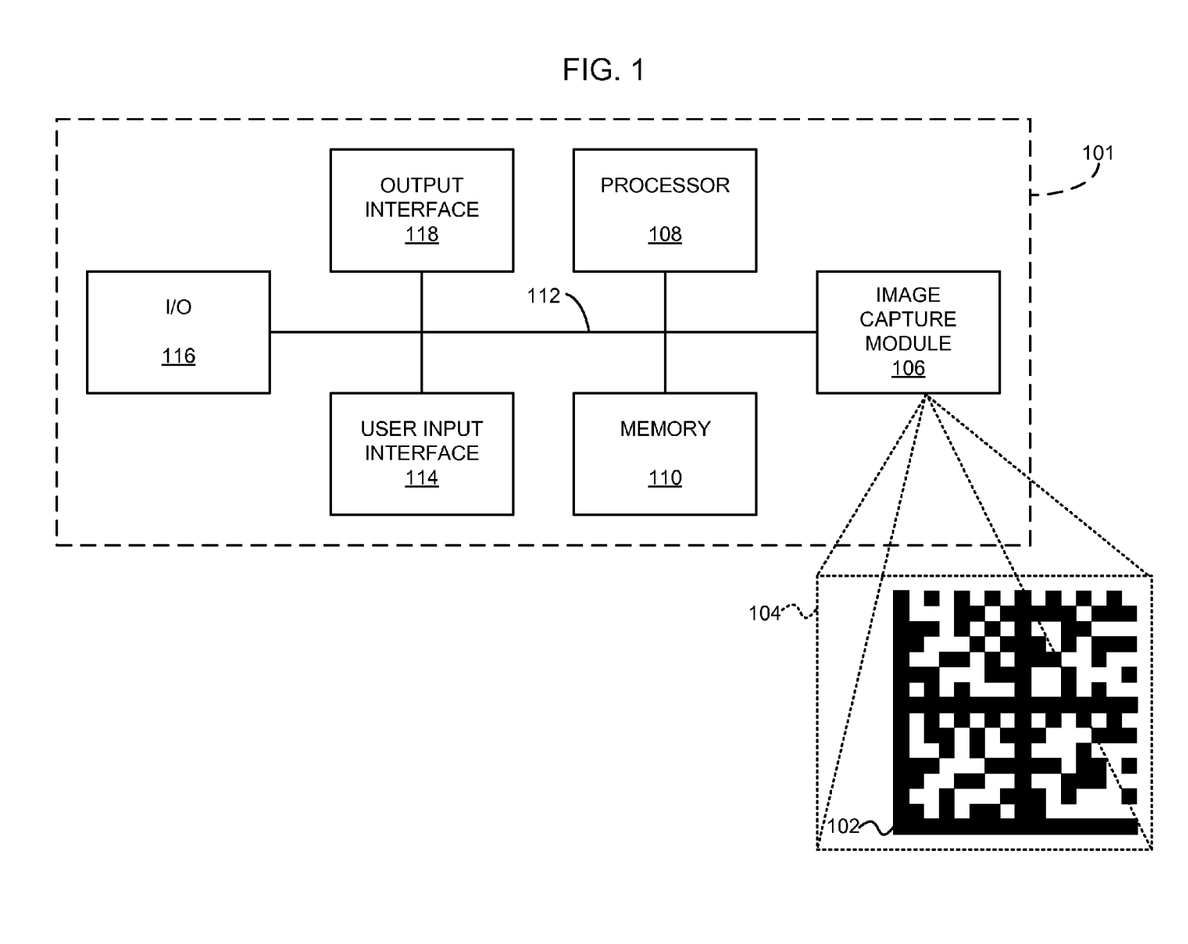
FIG. 1 is a block diagram of an end device having an ability to read and use data from a capacity limited portable data carrier, according to an embodiment.

FIG. 1 is a block diagram of an end device 101 having an ability to read and use a partial data set from a portable data carrier 102, illustratively shown as a two-dimensional (2D) bar code symbol. The end device 101 may, for example, be embodied as a dedicated bar code reader, may be embodied as an image capture device plus a host PC, may include a handheld computer, or may be integrated into and/or include a cell phone, digital audio player, digital video player, or other electronic apparatus.

The end device 101 includes a capture device 106, shown as an image capture module, operable to interrogate the portable data carrier 102. For example, according to various embodiments, the portable data carrier 102 may include a bar code symbol such as a linear or one-dimensional (1D) or 2D symbol. In such a case, the capture device 104 may be an image capture device that comprises a focal plane detector array, such as a CMOS or CCD array combined with appropriate optical, mechanical, and control elements operable to capture one or more images of a field of view 104 including some or all of the symbol 102. Alternatively, the image capture module 104 may include a non-imaging detector such as a scanned beam image capture device.

According to embodiments, the portable data carrier 102 may comprise a wirelessly addressable portable memory such as an RF tag. In such a case, the capture device 106 may include a radio frequency interrogator operable to read and/or write from and to the portable data carrier.

According to an embodiment, the image capture module, optionally with at least a portion of the user input interface 114, such as a trigger, may be packaged and configured for communication with the other blocks shown in FIG. 1, which may be embodied as a PC. According to an embodiment, the end device 101 includes a microprocessor, microcontroller, or other electronic control apparatus forming a processor 108 operable to execute computer instructions such as expressed in software, firmware, state machine configuration, etc. The end device 101 may also include memory 110 such as random-access memory, flash memory, read-only-memory, static memory, etc. operable to provide at least temporary image storage, workspace, and program space. The memory 110 may be present as a permanent or removable device operatively connected to the processor 108 and capture module 106 across a bus 112, and/or may be present as embedded memory in the processor 108. The memory 110 may comprise a contiguous memory, such as on a single die, or may be distributed across plural physical devices, and/or be divided or allocated logically to various functional portions.

The end device 101, according to embodiments, also includes a user input interface 114, such as a trigger, keypad, pointer, etc., an optional computer interface 116 operable to communicate with other devices, and/or an optional output interface 118, such as an audio output, display, and/or other visual, tactile, or audio indicator.

In operation, the end device 101 may receive one or more commands from a user through the user input interface 114 to read the portable data carrier 102. The processor 108 may responsively drive the capture module 106 to interrogate the portable data carrier 102 and write at least a representation of read data to the memory 110. As described elsewhere herein, the processor 108 may execute computer instructions to recover as much data or payload as possible from the portable data carrier 102 using any error correction available; possible error correction being available in the portable data carrier encoding level and/or in native payload error correction; and subsequently use the partially or completely recovered data in an application.

According to an embodiment, the end device 101 may transmit the partially or completely recovered data through the interface 116 to a remote resource. Alternatively, the end device 101 may express the partially or completely recovered data through an output interface 118. For example, when the portable data carrier 102 encodes audio data, the processor 108 may run an audio codec or transfer the data to a hardware audio codec embedded within the output interface 118. The corresponding output file may then be played to a user through an amplifier and through a speaker or headphone jack included in the output interface 118. In instances when only partial data is recovered from the portable data carrier, the processor 108 may be operable to run the codec to output the portion of the data recovered, for example inserting blank or masking periods for non-recovered data portions.

According to embodiments, the end device 101 may be configured to run software or firmware to decode printed symbol embodiments and/or determine a location of or decode segment identification fields. According to various embodiments, such software or firmware may include computer executable instructions for performing or using: a plurality of computational methods, image processing, performing a Fourier transform, a phase mask, a chipping sequence, a chipping sequence along an axis, pattern matching in the image domain, pattern matching in the frequency domain, finding bright spots in the frequency domain, synthesizing data from a neighboring data segment, pseudo-decoding data from a neighboring data segment, a finder pattern, finding parallel edges, finding a finder pattern, centers decoding, image resolution using a priori knowledge of symbol structure, closure decoding, edge finding, uniform acceleration compensation, surface de-warping, anti-aliasing, frame transformation, frame rotation, frame de-skewing, keystone correction, Gray Code, pattern phase, phase comparison, delta distance, local thresholding, global thresholding, modulation compensation, image inversion, inverted image projection, sampling image regions positioned relative to a finder, etc.

Figure 2:
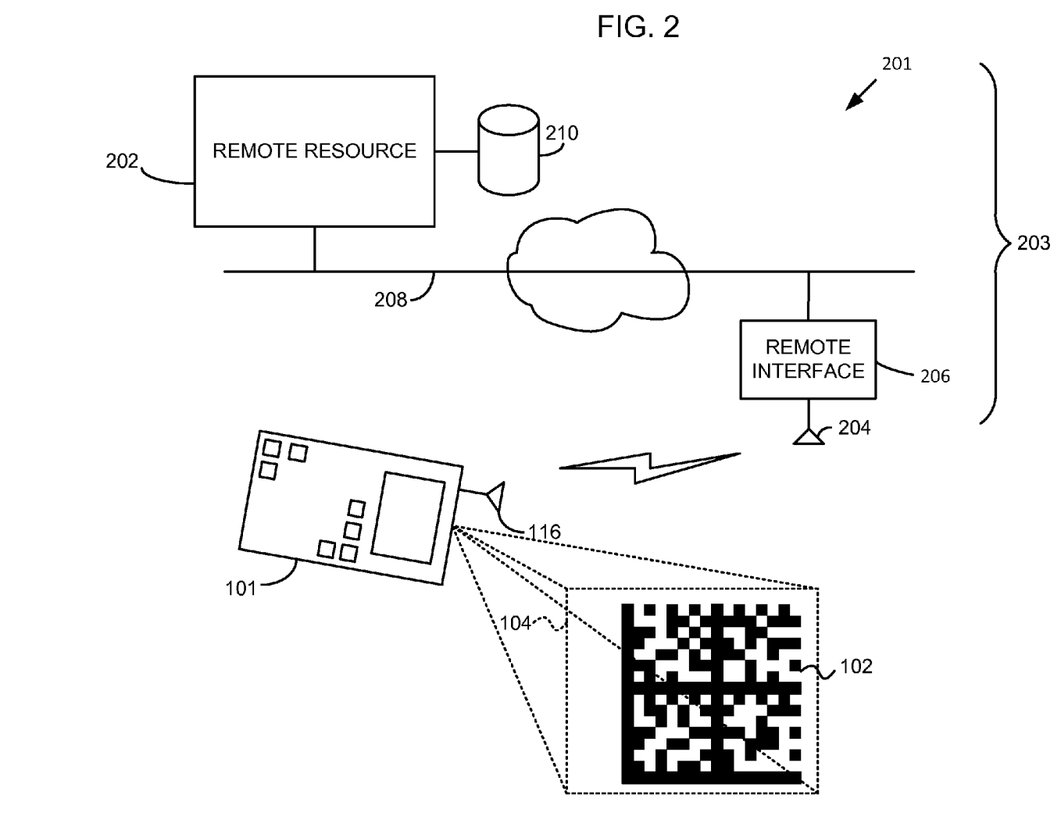
FIG. 2 is a block diagram of a networked end device and server resource having an ability to read and use data from a limited capacity portable data carrier, according to an embodiment.

FIG. 2 is a diagram 201 of an end device 101 operatively coupled to a remote system 203 having an ability to process partial data received from a portable data carrier 102, according to an embodiment. According to an embodiment, the end device 101 may transmit a sequence of data fragments read from the portable data carrier 102 over a data link between the computer interface 116 of the end device and a remote interface 206. Optionally, the remote resource may include video, audio, or other output interfaces and may play back content corresponding to the data. Optionally, the remote resource may store the data and/or transmit data corresponding to the data to another resource (not shown) or back to the end device 101 for playback.

The remote system 203, collectively represented as a remote resource 202 with coupled data storage 210, data channel or network 208, remote interface 206 and physical interface 204 may be embodied as disparate apparatuses; or alternatively may be embodied as a single apparatus, such as a personal computer for example. The data transmission channel between the end device interface 116 and the remote interface 206 may include a wired channel such as electrical or guided optical signals, or may include a wireless channel such as radio or infrared. The remote interface 206 may, for example, include a gateway, access point, router, switch, interface card, embedded chipset or other apparatus having a physical interface 204 operable to communicate with the end device 101.

According to an embodiment the end device 101 may include a cell phone or other personal communications device and the remote interface 206 may represent a portion of a cellular network. The remote interface 206 may operate to route the sequence of data fragments to the remote resource 202 over a network 208 such as the Internet. The server 202 may include a facility for applying error correction and/or error enhancement to the data fragments from the portable data carrier 102. Such error correction and enhancement may return the corrected and/or enhanced data to the end device 101, such as for playback, may store the corrected and/or enhanced data in a storage apparatus 210 for later retrieval by the end user, and/or may execute wildcard data access using the data fragments, etc.

According to an alternative embodiment, the end device 101 may error correct and/or enhance the data from the portable data carrier 102 and then access the server 202 to retrieve associated data held in a database 210, to report access to the database 210, to process a transaction, etc.

According to embodiments, the end device 101 and the remote system 203 may cooperate to perform some or all of the functions described above in conjunction with FIG. 1.

Figure 3:
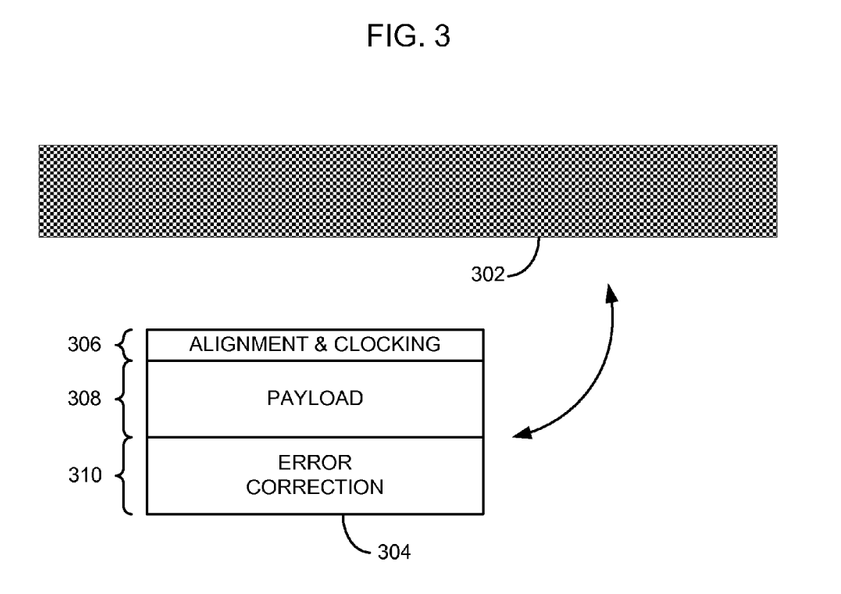
FIG. 3 is an example of a bar code symbol with error correction encoding a given amount of data along with a memory map, according to an embodiment.

FIG. 3 is a depiction of a simulated 2D matrix symbol 302 6 inches by one-half inch in size and carrying 8000 bytes of data. The data contents of the 2D matrix symbol 302 is shown in the data map 304, the symbol 302 thus containing a portion of bytes associated with alignment and clocking 306, a payload comprising the data of interest 308, and error correction 310 for recovering data lost due to printing errors, ageing or damage to the symbol, and reader errors.

Figure 4A:
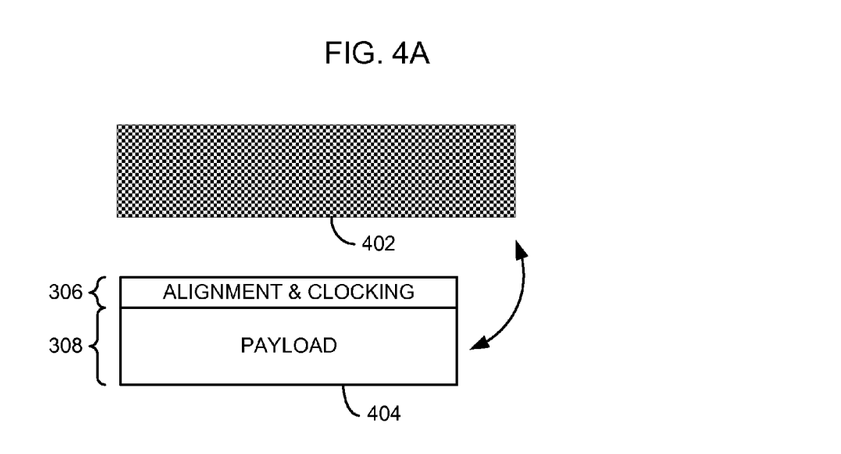
FIG. 4A is an example of a bar code symbol without error correction encoding substantially the same amount of data as the symbol of FIG. 3, according to an embodiment.

FIG. 4A is a depiction of a simulated 2D matrix symbol 402 corresponding to the symbol 302 of FIG. 3, but with the error correction removed. As may be seen in the associated data map 404, the data includes alignment and clocking bits 306, and the payload 308, with substantially no error correction. The elimination of error correction in the symbol 402 may result in a printed symbol approximately half the physical size of the symbol 302 of FIG. 3 assuming equivalent cell size or X-dimension.

The removal of error correction 310 from the data 304 to create the data 404, along with the reduction in symbol size for symbol 402 compared to the symbol 302 is one example of optimizing data to fit into a symbol. For example, another approach may be used (optionally in conjunction with error correction removal) such as cropping the data file, decreasing a sampling rate, removing least significant bits, reducing a frequency range, decreasing harmonic content, converting to a higher compression file format, omitting data segments, reducing dynamic range, etc. Tradeoffs between these and other options may be made automatically by software running on a processor. Determining the best combination to reach a symbol size, such as a fixed symbol size, may be considered optimizing one or more encoding parameters. In addition to reducing the size of the data file, such as by using the illustrative approaches presented above, optimizing one or more encoding parameters may include modifying data file error correction, eliminating data file error correction, reducing data file error correction, modifying or selecting symbol error correction, reducing symbol error correction, and eliminating symbol error correction (as exemplified by the removal of error correction portion 310).

Figure 4B:
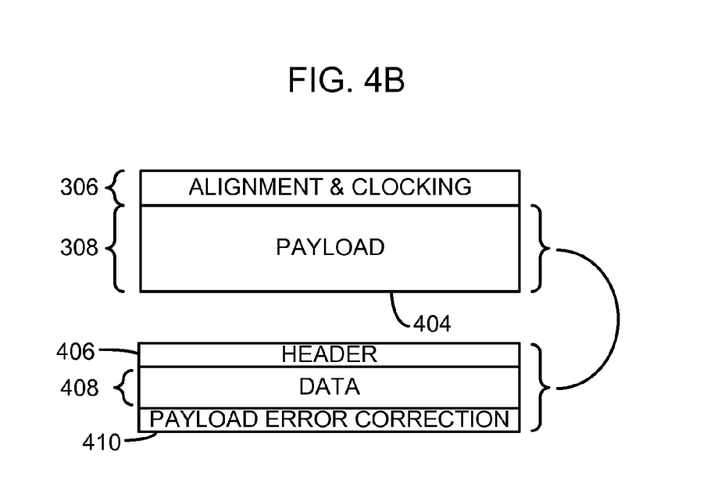
FIG. 4B is a depiction of the memory map FIG. 4A showing the contents of the payload, according to an embodiment.

FIG. 4B is a depiction of the memory map 404 of FIG. 4A showing the contents of the payload 308, according to an embodiment. As may be seen, in some embodiments, the payload is not necessarily all data; it may include a header 406, data 408, and payload error correction 410. Accordingly, it may be seen that the reduced size symbol 402 shown in FIG. 4A is not necessarily devoid of error correction. Rather, payload error correction may remain. Thus the reduced size symbol 402 has eliminated redundant error correction without completely removing all error correction.

Figure 4C:
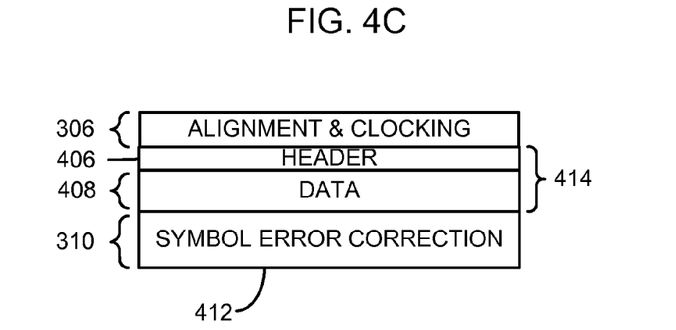
FIG. 4C is a depiction of a memory map showing an alternative approach to reducing the physical size of the original bar code symbol of FIG. 3, according to an embodiment.

FIG. 4C is a depiction of a memory map 412 showing an alternative approach to reducing the physical size of the original bar code symbol 302, according to an embodiment. In this case, the payload error correction 410 has been removed. The remaining portions including the header 406 and the data 408 comprise the reduced payload 414. Symbol error correction 310 may then be added, however because the reduced payload 414 carries less data due to the elimination of its error correction, the symbol error correction 310 may be similarly reduced while maintaining substantially the same percentage of redundancy compared to the symbol error correction used in the original symbol 302 of FIG. 3.

While the examples of FIGS. 3 and 4A-4C are directed to embodiments using a printed pattern such as a bar code symbol as a portable data carrier. Similar considerations may be applicable to embodiments using one or more RF tags as portable data carriers. A typical application for the symbol 302 of FIG. 3 may be the storage of sound in a bar code symbol. U.S. patent application Ser. No. 11/197,754; invented by Kenneth A. Berkun; filed Aug. 4, 2005; and entitled Systems and Methods for Generating Reading and Transferring Identifiers is incorporated herein by reference, and includes description and enablement regarding the storage of sound in a bar code symbol. A 6 inch by ½ inch barcode may contain about 8000 bytes of encoded sound. This may represent 10 seconds of speech. If 10% of the data is lost when it is read, then about 800 bytes, or 1 second of speech is lost. If this happens to be spread across the 10 second message in 4 one-quarter second bursts, then the user may not even notice that sound is missing, and in any case will usually understand the message.

The same may apply for video data, where missing data simply shows as a short burst of static or blank screen. This may also apply to static images (such as jpg or bitmap graphics) where the image is still recognizable even if parts are blank or jumbled. Thus, data from a portable data carrier may be usable even if less than the full amount is reconstructed.

Figure 5:
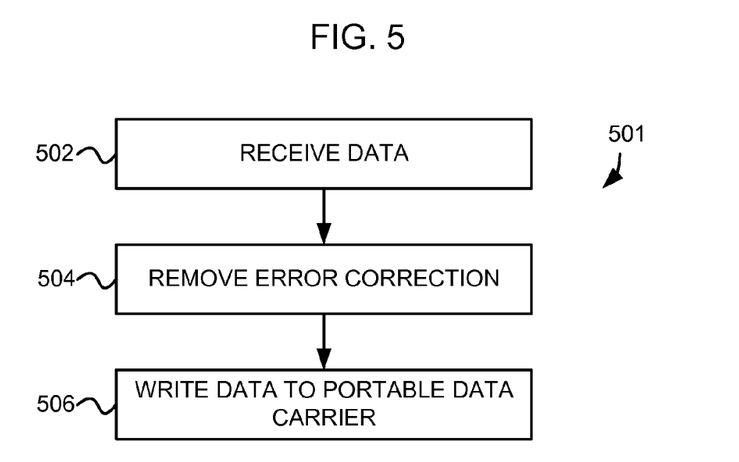
FIG. 5 is a flow chart showing a process for writing data having reduced error correction to a portable data carrier, according to an embodiment.

FIG. 5 is a flow chart 501 showing a process for writing data having reduced error correction to a portable data carrier, according to an embodiment. In step 502, data is received. Such data may be received from a data file that is read; may comprise streaming data that is received over an interface; and/or may include data that is input by a user including keyboard entry, pointing tool entry, voice entry, video entry, etc.; for example. When received data includes native error correction (e.g., "payload" error correction as shown in FIG.

4B), the process may proceed to step 504 where the error correction is removed from the data. Proceeding to step 506, the data may then be written to a portable data carrier. As discussed above, symbol error correction may be calculated and appended, such as to form a data map represented by the data map 412 of FIG. 4C. Alternatively, step 506 may involve writing data to a portable data carrier having no symbol (or RF tag) error correction, thus producing a portable data carrier with lossy data having substantially no error correction.

Figure 6:
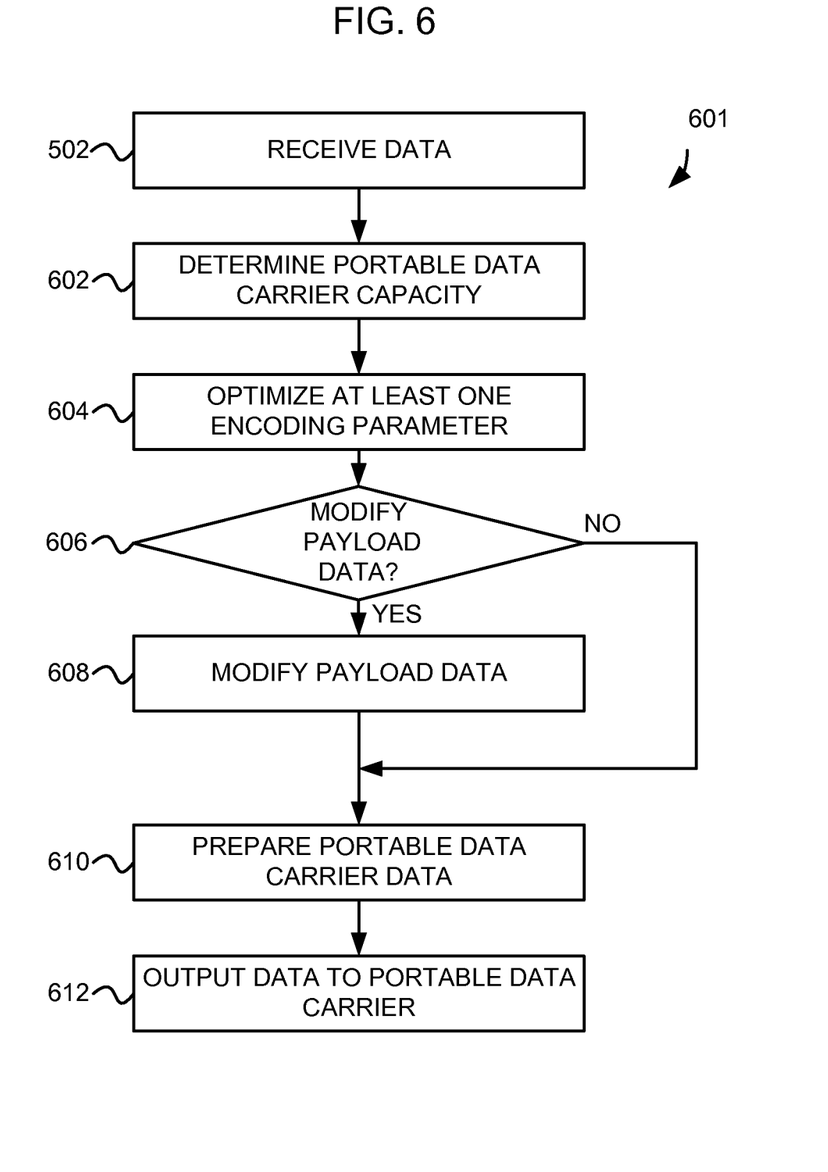
FIG. 6 is a flow chart showing a process for writing data to a portable data carrier having reduced error correction, according to an embodiment.

FIG. 6 is a flow chart showing a process 601 for receiving data and optimizing encoding parameters for writing the data to a portable data carrier. For example, the process 601 may be applied to fitting an audio file into a portable data carrier having fixed size or capacity. In step 502, data is received for storing in a portable data carrier. Such data may, for example, include audio data or video data. Step 502 may include transducing an audible signal to a corresponding electrical signal, and converting the electrical audio signal to a corresponding data file. Alternatively, transduction and/or signal conversion may occur in an external apparatus that provides the data file.

Proceeding to step 602, the program determines the capacity of a target portable data carrier to which data will be output. For example, a portable data carrier may have a fixed size such as a fixed bitmap or a fixed memory capacity. Alternatively, a portable data carrier may have a series of capacities, such as a plurality of versions of a 2D matrix symbol, or a series of RF Tag models, or a portable data carrier may include a plurality of portable data carriers. For example, an output file may be encoded in a single bar code symbol, in two associated bar code symbols, etc. Step 602 determines a fixed or variable capacity that may best match the capacity requirements of a set of output data. As will be seen, this may involve selecting a capacity that is nominally too small for the amount of output data, but to which the data will be adapted.

Proceeding to step 604, at least one encoding parameter is optimized according to the nominal size of the payload data received in step 502 and the portable data carrier capacity determined in step 602. For example the size of the payload data may be reduced by some amount determined by trading off payload data size against a portable data carrier overhead and/or error correction configuration. Similarly, a portable data carrier overhead and/or error correction configuration may be modified or selected to reduce symbol real estate or RF tag memory that could be dedicated to such functions. For example, plurality of portable data carrier configuration and/or encoding parameters may be selected to balance the probability of symbol reading against the quality of an audio file encoded in the data.

Proceeding to decision step 606, if an optimum configuration is to modify the payload data, the process proceeds to step 608 where the payload data is modified. The size of the payload data may be reduced using several techniques that may for example include cropping the data file, decreasing a sampling rate, removing least significant bits, reducing a frequency range, decreasing harmonic content, converting to a higher compression file format, omitting data segments, reducing dynamic range, reducing payload error correction, etc.

If an optimum configuration does not involve modification of payload data, the process may proceed from decision step 606 to step 610. Otherwise, the process may proceed from step 608 to step 610. In step 610, portable data carrier data is prepared. For example, in step 610 a bitmap may be generated for printing a symbol such as a 2D matrix symbol or data may be formatted for writing to a Read-Write or Write-Once-Read-Many Times (WORM) RF tag.

Figure 12:
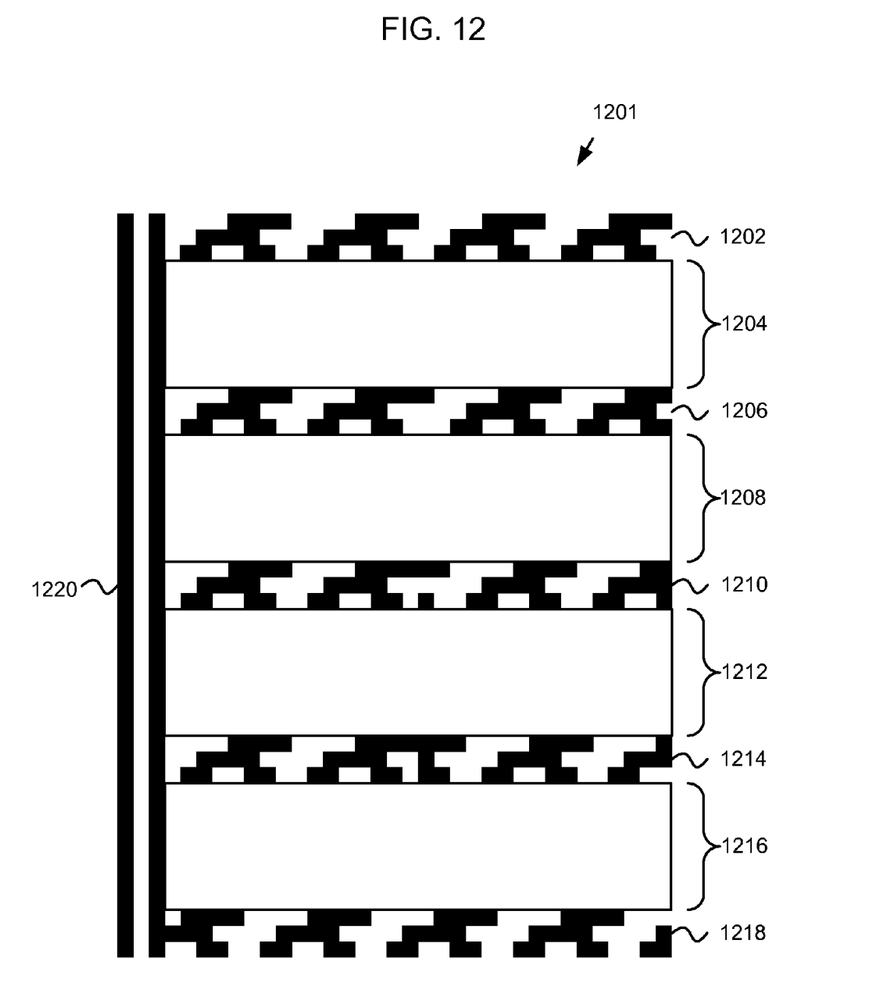
FIG. 12 is an embodiment of a 2D matrix bar code symbol that includes a plurality of data segments.

Encoding parameters selected in step 604 may affect the behavior of step 610 in several ways, including for example, an amount of portable data carrier error correction including reduced or eliminated portable data carrier error correction, data segment parsing including size, number, and size distribution of data segments, finder pattern assignment, data segment identification field encoding, etc. An illustrative 2D matrix bar code symbol diagram that includes a plurality of data segments with data segment identification fields is shown in FIG. 12.

The process 601 next proceeds to step 612, where the prepared portable data carrier data is output to one or more portable data carriers. For example, step 612 may include outputting a bitmap of one or more bar codes, printing a bar code label, outputting a data file for writing to one or more RF tags, or writing data to one or more RF tags.

According to various embodiments, data may be written to a portable data carrier with no "symbol error correction", thus producing data in a configuration corresponding to the memory map 404 of FIG. 4A. However, as shown in FIG. 4B, the payload may still include payload error correction, thus providing a degree of error correction and recovery capability. For applications lacking payload error correction, the output of the process 601 may be a portable data carrier having lossy data with substantially no error correction.

For instance, audio data may include multiple copies of each sound packet. The embodiment of FIG. 6 may select a data configuration that eliminates "double redundancy" where the important data is already redundant in the data going into the portable data carrier encoder.

Figure 7:
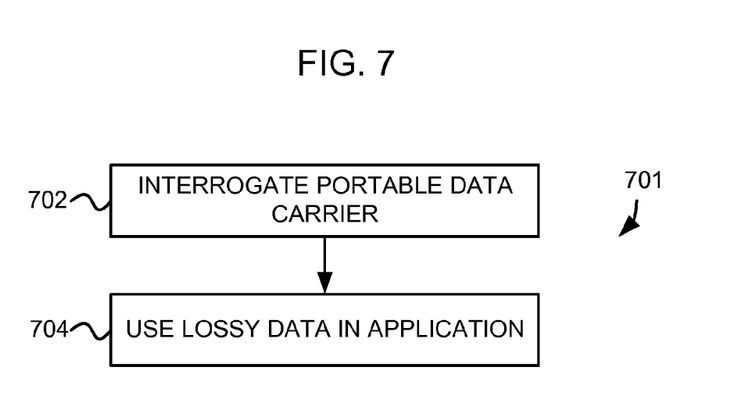
FIG. 7 is a flow chart showing a process for interrogating a portable data carrier and using partially recovered data, according to an embodiment.

FIG. 7 is a flow chart showing a process 701 for interrogating a portable data carrier and using a partially recovered data set, according to an embodiment. In step 702, one or more portable data carriers are interrogated and lossy data is received. Thus may include, for example, reading a 1D or 2D bar code symbol, interrogating an RF tag, reading a magnetic stripe, reading a MICR message, etc. Proceeding to step 704, the lossy data received from the portable data carrier is used in an application. Streaming media applications may be particularly appropriate for processing lossy data because such data do not necessarily result in persistent errors. Rather, the error may stream and, in some cases, be gone before the user realizes the data is missing. Other applications that may make persistent use of data may also be adapted to use lossy data.

Figure 8:
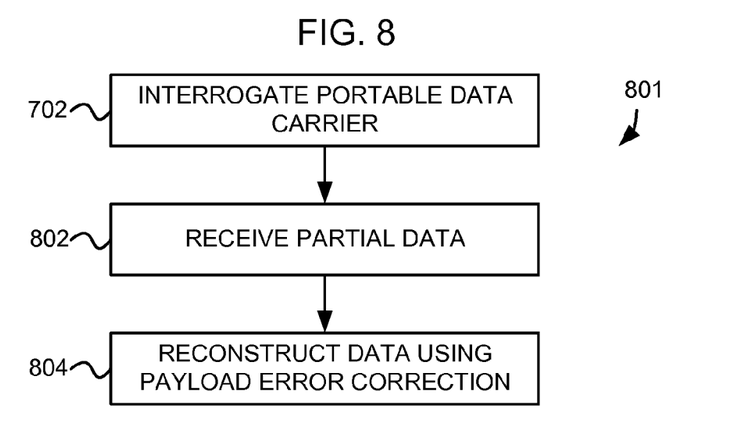
FIG. 8 is a flow chart showing a process for interrogating a portable data carrier and using payload error correction to reconstruct data not read from the portable data carrier, according to an embodiment.

FIG. 8 is a flow chart showing a process 801 for interrogating a portable data carrier and using payload error correction to reconstruct data not read from the portable data carrier, according to an embodiment. In step 802, the processor may determine that the capture device has captured substantially all the information available to be captured, even though no error correction has been performed. This may be due to the portable data carrier including substantially no symbol error correction. Alternatively, this may be due to the portable having received too much damage or being in an interference environment, and thus the capture device was not able to receive sufficient data to perform error correction. Proceeding to step 804, the system applies payload error correction to the partial data to reconstruct the payload data.

Figure 9:
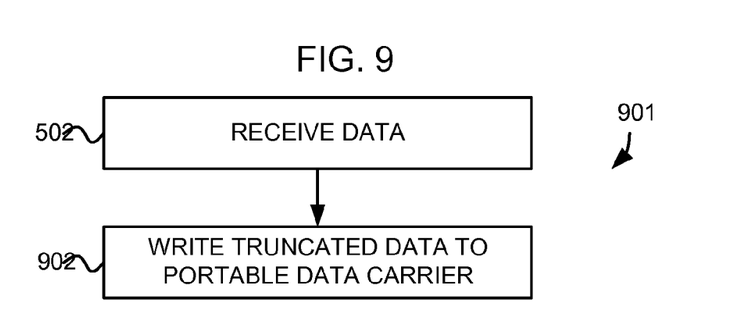
FIG. 9 is a flow chart showing a process for receiving data and writing truncated data to a portable data carrier, according to an embodiment.

FIG. 9 is a flow chart showing a process 901 for receiving data and writing truncated data to a portable data carrier, according to an embodiment. In some applications, a portable data carrier may have a substantially fixed maximum capacity or a series of thresholds. When the amount of data received in step 502 exceeds a threshold or capacity, the process may truncate or depopulate the data such that the remaining payload fits in a given portable data carrier. Such truncation may be performed strategically, such as by providing short blank periods during an audio file, removing data carrying harmonics but leaving fundamental tones, removing data beyond the frequency response of a playback device, etc.

Figure 10:
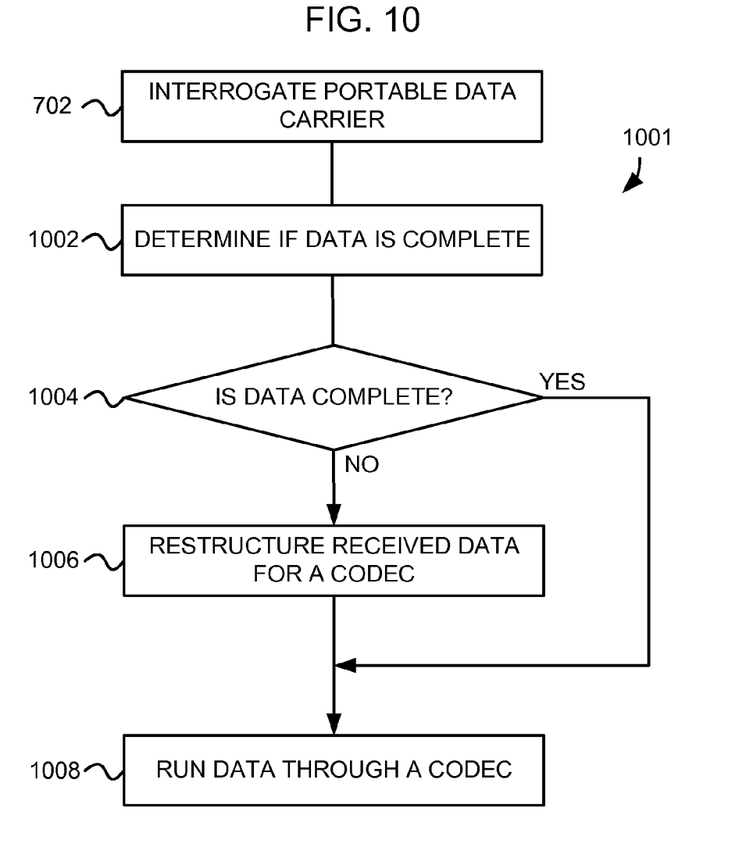
FIG. 10 is a flow chart showing a process for using partial data received from a portable data carrier, according to an embodiment.

FIG. 10 is a flow chart showing a process 1001 for using lossy data from a portable data carrier, according to an embodiment. The process 1001 is an example of a process 701 for receiving and using lossy data. In step 702, a portable data carrier is interrogated. Such interrogation may return incomplete data from the portable data carrier. The process proceeds to step 1002 where the interrogated data may be analyzed for completeness, and particularly analyzed to determine if the returned data is continuous. This may be done, for example, by identifying segments of data returned from the symbol and determining if any gaps exist between segments. Alternatively, the signal may be analyzed to determine if a substantially constant frequency component is phase shifted between data segments and/or if an improbable transient exists between the data segments to indicate a gap in the data. Should a data gap be deduced, pad data is inserted to place the returned data back into proper temporal registration. The pad data may include a blank interval, may alternatively include white or pink noise (or video) that may be amplitude and/or frequency matched with the neighboring returned data segments, may include a morph between the spaced-apart returned data segments, or may include a duplication of one of the neighboring segments or another segment or duration of data selected to match the spaced apart segments. The processor then proceeds to step 1004 and runs the partial data through a codec such as an audio codec and produces audio output corresponding to the remaining data.

Figure 11:
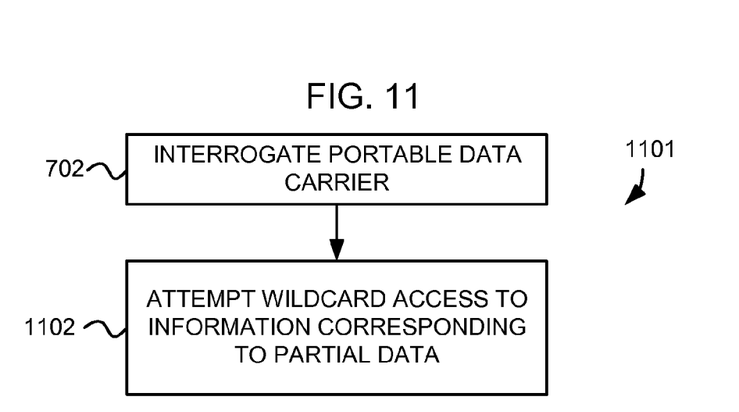
FIG. 11 is a flow chart showing a second process for using partial data from a portable data carrier, according to an embodiment.

FIG. 11 is a flow chart showing a process 1101 for using a partial data set from a portable data carrier, according to an embodiment. After receiving partial data from the portable data carrier in step 702, the process proceeds to step 1102 where the system attempts to recover the remaining data using contextual insertion or substitution. For example, when the lossy data corresponds to a partial database record identifier, the system may sequentially insert data into non-recovered sections of the data. For example, the application may insert a "wildcard" character in place of the missing data and recover all matching records. If only one record matches the remaining data, the application may proceed with minimal interference, and optionally no notification to the user. If more than one record matches the remaining data, the application may automatically apply contextual rules to determine the most likely match and/or alert a user and prompt the user to select from a set of candidate records.

According to an embodiment, partial data recovery is more desirable than no data recovery. For instance a 2D bar code symbol may contain considerable information, such a product description. The bar code symbol may be heavily damaged (for instance by water or ripping) and a typical barcode reader may report failure. Nonetheless 50% or more of the data may be valid. According to an embodiment, the readable data is recovered, rather than deeming the entire bar code symbol reading attempt a loss. Human beings are very good at inferring missing data and may decide that something is better than nothing.

FIG. 12 illustrates a segmented bar code symbol 1201 that includes a plurality of data segments 1204, 1208, 1212, and 1216. The rectangles corresponding to each data segment are shown for clarity and are not literally printed. The rectangles 1204, 1208, 1212, and 1216 represent areas where elements or cells may be printed. The elements may be printed, for example, in 8 element groups, each group representing a byte of data. According to the illustrated embodiment, each of the data segment regions 1204, 1208, 1212, and 1216 has a capacity of 32 cells wide by 8 cells high, which may be defined to contain 4 bytes wide by 8 bytes high, for 32 byte capacity each. Of course, the capacity of the data segments 1204, 1208, 1212, and 1216 may be increased or decreased according to application requirements. The segments 1204, 1208, 1212, and 1216 may alternatively be made non-substantially equal in size, and may be allocated to fit the data.

Associated with each data segment is a respective data location field, shown immediately above each corresponding segment. The data location field 1202 encodes a two-digit Gray Code octal value 00. Thus, the corresponding data segment 1204 may be regarded as data segment 00. Similarly, the data location field 1206, associated with data segment 1208, encodes an octal value 01, and thus data segment 1208 is labeled data segment 01. Following a similar pattern, data location field 1210 labels data segment 1212 data segment 02, and data location field 1214 labels data segment 1216 as data segment 03. Data location field 1218 encodes octal "55". According to an embodiment, a data location field value 55 identifies the end of the symbol.

Three bars (one white bar between two black bars) on the left side of the symbol 1201 form an optional finder pattern 1220 for the symbol. A reading apparatus may search for the finder pattern 1220 to determine the location of a symbol, an approach that may significantly decrease overall computation time. The illustrative finder pattern 1220 may also act as a registration feature that may be used to determine an axis along which the data segments are placed (parallel to the bars) and for determining a zero location in the horizontal axis and a feature for determining the phase of the Gray Code patterns 1202, 1206, 1210, 1214, and 1218.

As discussed above in conjunction with FIG. 6, the number, size, and size distribution of the data segments 1204, 1208, 1212, and 1216, the explicit existence and encoding type of the segment identifiers 1202, 1206, 1210, 1214, and 1218, and the existence and type of the finder pattern(s) 1220 may be adjusted to accommodate a symbol real estate limitation and/or an amount of payload data to be encoded in the symbol 1202. For example smaller data segments 1204, 1208, 1212, and 1216 may be optimum for symbols encoding an audio file and having no error correction because the loss of a smaller segment may be better tolerated in an audio file than the loss of a larger segment. On the other hand, when some amount of symbol error correction is used (generally embedded within the data segments 1204, 1208, 1212, and 1216), larger segments may be preferable to avoid the overhead associated with the segment identification fields 1202, 1206, 1210, 1214, and 1218. Other trade-offs may similarly programmed into the logic used in FIG. 6, step 604.

The preceding overview, brief description of the drawings, and detailed description describe illustrative embodiments according to the present invention in a manner intended to foster ease of understanding by the reader. Other structures, methods, and equivalents may be within the scope of the invention. The scope of the invention described herein shall be limited only by the claims.

What is claimed:

1. A method for writing data to a bar code symbol having limited capacity comprising:
   receiving a data file encoding a human perceivable signal;
   reducing the size of the data file; and
   bitmapping a 2D bar code symbol to include the reduced size data file.

2. The method of claim 1 further comprising:
   determining an amount of data to be removed from the received data file to fit in a bar code symbol; and wherein the size of the data file is reduced by the determined amount of data to be removed.

3. The method of claim 1 wherein the size of the data file is reduced by at least one selected from the group consisting of: cropping the data file, decreasing a sampling rate, removing least significant bits, reducing a frequency range, decreasing harmonic content, converting to a higher compression file format, omitting data segments, reducing dynamic range, and reducing error correction.

4. The method of claim 1 further comprising:
transducing an audio signal to a corresponding electrical signal; and
converting the electrical signal to the data file.

5. A method for writing data to a bar code symbol having limited capacity comprising:
receiving a data file; and
optimizing at least one encoding parameter to fit at least a portion of the data file into a bar code symbol;
wherein optimizing at least one encoding parameter includes selecting the at least one encoding parameter to fit a fixed symbol size.

6. The method of claim 5 further comprising:
generating a 2D matrix bar code bitmap using the at least one optimized encoding parameter.

7. The method of claim 5 further comprising:
printing a 2D matrix bar code using the at least one optimized encoding parameter.

8. The method of claim 5 wherein optimizing at least one encoding parameter includes selecting at least one selected from the group consisting of:
data file error correction, eliminated data file error correction, reduced data file error correction, symbol error correction, reduced symbol error correction, eliminated symbol error correction, and data reduction from the data file.

9. The method of claim 5 wherein optimizing the at least one encoding parameter includes selecting a plurality of encoding parameters that balance the probability of symbol reading against the quality of an audio file encoded in the data.

10. The method of claim 5 wherein optimizing at least one encoding parameter includes selecting a size of a plurality of data segments.

11. The method of claim 5 wherein the data file includes an audio file.

12. A system configured to output a bar code symbol carrying audio data comprising:
a memory configured to receive an audio data file; and
a processor configured to optimize at least one encoding parameter to fit at least a portion of the audio data file into a bar code symbol;
wherein optimizing at least one encoding parameter includes selecting the at least one encoding parameter to fit a fixed symbol size.

13. The system of claim 12 further comprising:
an audio codec configured to receive an audio signal and output the audio data file to the memory.

14. The system of claim 12 wherein optimizing at least one encoding parameter includes selecting at least one selected from the group consisting of:
data file error correction, eliminated data file error correction, reduced data file error correction, symbol error correction, reduced symbol error correction, eliminated symbol error correction, data reduction from the data file, and a size of a plurality of data segments.

15. The system of claim 12 wherein optimizing the at least one encoding parameter includes selecting a plurality of encoding parameters that balance the probability of symbol reading against the quality of an audio file encoded in the symbol.

* * * * *